United States Patent
Cho et al.

(10) Patent No.: US 11,054,621 B2
(45) Date of Patent: Jul. 6, 2021

(54) CAMERA, AND IMAGE DISPLAY APPARATUS INCLUDING THE SAME

(71) Applicant: LG ELECTRONICS INC., Seoul (KR)

(72) Inventors: Sunho Cho, Seoul (KR); Dongryeol Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 411 days.

(21) Appl. No.: 16/045,381

(22) Filed: Jul. 25, 2018

(65) Prior Publication Data

US 2019/0056574 A1 Feb. 21, 2019

Related U.S. Application Data

(60) Provisional application No. 62/536,475, filed on Jul. 25, 2017.

(30) Foreign Application Priority Data

Jul. 16, 2018 (KR) .................. 10-2018-0082237

(51) Int. Cl.
  *G02B 17/04* (2006.01)
  *G02B 7/04* (2021.01)
  (Continued)

(52) U.S. Cl.
  CPC ............ *G02B 17/045* (2013.01); *G02B 7/04* (2013.01); *G02B 13/0065* (2013.01);
  (Continued)

(58) Field of Classification Search
  None
  See application file for complete search history.

(56) References Cited

U.S. PATENT DOCUMENTS 6,327,238 B1 * 12/2001 Nishiwaki ............... G02B 5/04
  369/112.21
6,850,279 B1 * 2/2005 Scherling ............. H04N 5/2251
  348/335
(Continued)

FOREIGN PATENT DOCUMENTS

CN     1225180     8/1999
WO  2016166730    10/2016

OTHER PUBLICATIONS

PCT International Application No. PCT/KR2018/008395, International Search Report dated Nov. 26, 2018, 3 pages.
(Continued)

*Primary Examiner* — Derek S. Chapel
(74) *Attorney, Agent, or Firm* — Lee, Hong, Degerman, Kang & Waimey PC

(57) ABSTRACT

Disclosed are a camera and an image display apparatus including the same. The camera according to an embodiment of the present invention comprises: a first optical structure configured to refract and reflect a first input beam to output a second beam with a width smaller than a width of the first input beam; and a second optical structure configured to refract and reflect the second beam from the first optical structure to output a third beam with a width greater than the width of the second beam, wherein the first optical structure comprises a first reflection surface configured to reflect the first input beam, and wherein a first angle between the first reflection surface and the second beam and a second angle between an orthogonal surface orthogonal to the first input beam and the first reflection surface are each greater than 0° and smaller than 45°. Accordingly, a thickness of the camera may be reduced.

20 Claims, 17 Drawing Sheets

(51) Int. Cl.
- *H04N 5/225* (2006.01)
- *G02B 17/02* (2006.01)
- *G03B 3/00* (2021.01)
- *G02B 13/00* (2006.01)
- *H04M 1/02* (2006.01)
- *G06F 3/041* (2006.01)
- *H04N 13/239* (2018.01)
- *G03B 5/00* (2021.01)

(52) U.S. Cl.
CPC ........... *G02B 17/023* (2013.01); *G02B 17/04* (2013.01); *H04M 1/0202* (2013.01); *H04M 1/0264* (2013.01); *H04N 5/2254* (2013.01); *G03B 3/00* (2013.01); *G03B 5/00* (2013.01); *G06F 3/041* (2013.01); *H04M 2250/52* (2013.01); *H04N 5/22525* (2018.08); *H04N 13/239* (2018.05)

(56) References Cited

U.S. PATENT DOCUMENTS

| | | | | |
|---|---|---|---|---|
| 8,836,856 | B2* | 9/2014 | Nomura | G03B 17/17 348/374 |
| 2004/0105025 | A1 | 6/2004 | Scherling | |
| 2005/0105061 | A1 | 5/2005 | DeLong | |
| 2007/0024739 | A1* | 2/2007 | Konno | G02B 13/002 348/337 |
| 2007/0052833 | A1* | 3/2007 | Matsui | H04N 5/2254 348/335 |
| 2012/0075728 | A1 | 3/2012 | Takakubo et al. | |
| 2015/0042870 | A1* | 2/2015 | Chan | H04N 5/23296 348/357 |
| 2015/0370040 | A1 | 12/2015 | Georgiev | |
| 2016/0161733 | A1 | 6/2016 | Li | |
| 2016/0166730 | A1 | 6/2016 | Matheny | |

OTHER PUBLICATIONS

Korean Intellectual Property Office Application No. 10-2018-0082237, Office Action dated Oct. 17, 2019, 5 pages.

The State Intellectual Property Office of the People's Republic of China Application Serial No. 201880062206.3, Office Action dated Feb. 2, 2021, 10 pages.

European Patent Office Application Serial No. 18839487.8, Search Report dated Mar. 16, 2021, 10 pages.

* cited by examiner

CAMERA, AND IMAGE DISPLAY APPARATUS INCLUDING THE SAME

CROSS-REFERENCE TO RELATED APPLICATIONS

Pursuant to 35 U.S.C. § 119, this application claims the benefit of earlier filing date and right of priority to U.S. Provisional Application No. 62/536,475, filed on Jul. 25, 2017, and also claims the benefit of Korean Application No. 10-2018-0082237, filed on Jul. 16, 2018, the contents of which are all incorporated by reference herein in their entirety.

BACKGROUND OF THE INVENTION

1. Field of the Invention

The present invention relates to a camera and an image display apparatus including the same, and, more particularly, to a camera with a reduced thickness and an image display apparatus including the same.

2. Description of the Related Art

A camera is an apparatus for photographing an image. Recently, as the camera has been installed in a mobile terminal, researches on a compact camera are being conducted.

Along with the trend of a compact camera, an autofocusing function and a hand tremor preventing function are increasingly employed.

As such, as more functions are added in a camera of a mobile terminal, it may be more difficult to make the camera compact. In particular, if a camera has a plurality of optical structures and a lens structure, it is difficult to implement a camera with small thickness.

SUMMARY OF THE INVENTION

The present invention has been made in view of the above problems, and provides a camera with a reduced thickness and an image display apparatus including the same.

The present invention further provides an image display apparatus including a camera, the apparatus which has a reduced thickness.

In accordance with an aspect of the present invention, a camera comprises: a first optical structure configured to refract and reflect a first input beam to output a second beam with a width smaller than a width of the first input beam; and a second optical structure configured to refract and reflect the second beam from the first optical structure to output a third beam with a width greater than the width of the second beam, wherein the first optical structure comprises a first reflection surface configured to reflect the first input beam, and wherein a first angle between the first reflection surface and the second beam and a second angle between an orthogonal surface orthogonal to the first input beam and the first reflection surface are each greater than 0° and smaller than 45°.

Meanwhile, a height of the first optical structure is based on the angle between the first reflection surface and the orthogonal surface, such that the height is increased as the angle approaches 0° the height is decreased as the angle approaches 45.

A height of the first optical structure is smaller than the width of the first input beam.

When the first beam is circular, the second beam is elliptical and the third beam is circular.

A ratio of the width of the second beam to the width of the first input beam is greater than 0.5 and smaller than 1.

The first optical structure comprises a first prism which comprises the first reflection surface.

The first beam may be refracted by a first light incident surface of the first prism, and the first beam may be refracted by a first light exit surface of the first prism.

The second optical structure may comprise a second reflection surface configured to reflect the second beam, and a third angle between the second reflection surface and the second beam and a fourth angle between an orthogonal surface orthogonal to the third beam and the second reflection surface are each greater than 0° and smaller than 45°.

The second optical structure may comprise a second reflection surface configured to reflect the second beam, and a third angle between the second reflection surface and the second beam and a fourth angle between an orthogonal surface orthogonal to the third beam and the second reflection surface are identical to the first angle between the first reflection surface and the second beam and the second angle between the orthogonal surface orthogonal to the first input beam and the first reflection surface.

The second optical structure may comprise a second prism, and a third angle between a second reflection surface of the second prism and the second beam and a fourth angle between an orthogonal surface orthogonal to the third beam and the second reflection surface of the second prism are each greater than 0° and smaller than 45°.

The first optical structure may include a first convex lens, a first mirror, and a first concave lens, and the first mirror comprises the first reflection surface. The second optical structure may comprise a second convex lens, a second mirror, and a second concave lens, and a third angle between a second reflection surface of the second mirror and the second beam and a fourth angle between an orthogonal surface orthogonal to the third beam and the second reflection surface of the second mirror are each greater than 0° and smaller than 45°.

The camera may further include a lens structure disposed between the first optical structure and the second optical structure, wherein the lens structure comprises a plurality of lenses and at least one of the plurality of lenses is movable to achieve variable focus.

The camera may further comprise an image sensor configured to convert light from the second optical structure into an electric signal corresponding to an image.

In accordance with another aspect of the present invention, a camera comprises: a first optical structure configured to refract and reflect a first input beam to output a second beam with a width smaller than a width of the first input beam; and a second optical structure configured to refract and reflect a second beam from the first optical structure to output a third beam with a width greater than the width of the second beam, wherein a ratio of the width of the second beam to the width of the first input beam is greater than 0.5 and smaller than 1.

The first optical structure may comprise a first reflection surface to reflect the first input beam, and a first angle between the first reflection surface and the second beam and a second angle between an orthogonal surface orthogonal to the first input beam and the first reflection surface are each greater than 0° and smaller than 45°.

An image display apparatus according to an embodiment of the present invention comprises: a case; a display; a camera disposed at a rear of the case; and a controller configured to control the display to display an image captured by the camera, wherein the camera comprises: a first optical structure configured to refract and reflect a first input beam to output a second beam with a width smaller than a width of the first input beam; and a second optical structure configured to refract and reflect the second beam from the first optical structure to output a third beam with a width greater than the width of the second beam, wherein the first optical structure comprises a first reflection surface configured to reflect the first input beam, and wherein a first angle between the first reflection surface and the second beam, a second angle between an orthogonal surface orthogonal to the first input beam and the first reflection surface, and a third angle between the rear surface of the rear case and the first reflection surface are each greater than 0° and smaller than 45°.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE PREFERRED EMBODIMENTS

Hereinafter, the present invention will be described in detail with reference to the accompanying drawings. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1A:
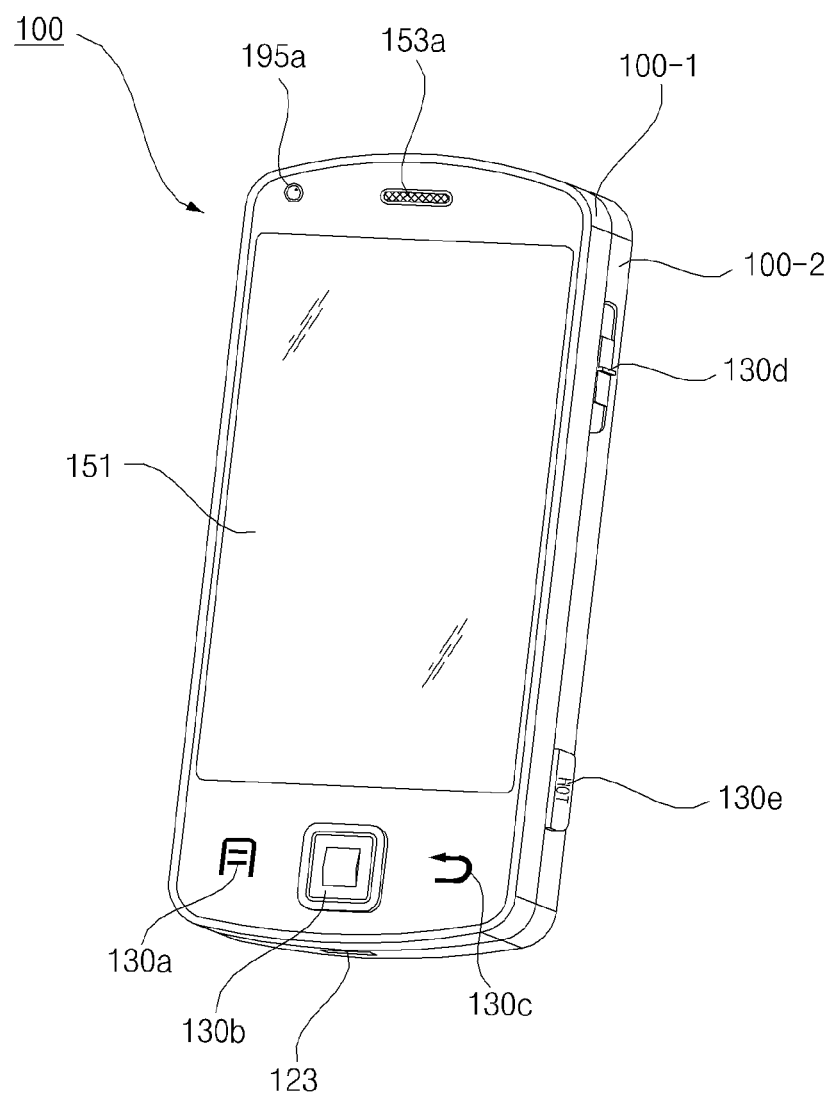
FIG. 1A is a perspective view of a mobile terminal as an example of an image display apparatus according to an embodiment of the present invention.
Figure 1B:
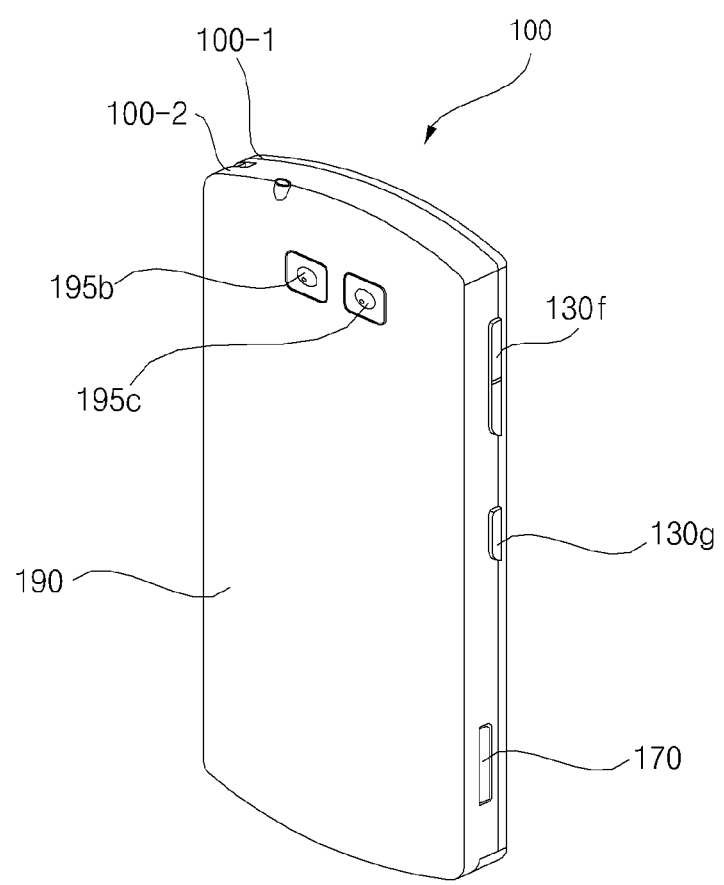
FIG. 1B is a rear perspective view of the mobile terminal shown in FIG. 1A.

FIG. 1A is a perspective view of a mobile terminal as an example of an image display apparatus according to an embodiment of the present invention, and FIG. 1B is a rear perspective view of the mobile terminal shown in FIG. 1A.

Referring to FIG. 1A, a case forming an outer appearance of a mobile terminal 100 may be formed by a front case 100-1 and a rear case 100-2. Various electronic components may be embedded in a space formed by the front case 100-1 and the rear case 100-2.

Specifically, a display 180, a first sound output module 153a, a first camera 195a, and a first to third user input units 130a, 130b, and 130c may be disposed in the front case 100-1. Further, a fourth user input unit 130d, a fifth user input unit 130e, and a first to third microphones 123a, 123b, and 123c may be disposed on a lateral surface of the rear case 100-2.

In the display 180, a touchpad may be overlapped in a layer structure so that the display 180 may operate as a touch screen.

The first sound output module 153a may be implemented in the form of a receiver or a speaker. The first camera 195a may be implemented in a form suitable for photographing an image or a moving image of a user, and the like. The microphone 123 may be implemented in a form suitable for receiving a user's voice, other sounds, and the like.

The first to fifth user input units 130a, 130b, 130c, 130d and 130e and the sixth and seventh user input units 130f and 130g described below may be collectively referred to as a user input unit 130.

The first microphone 123a and the second microphone 123b may be disposed in the upper side of the rear case 100-2, i.e., in the upper side of the mobile terminal 100, so as to collect an audio signal, and the third microphone 123c may be disposed in the lower side of the rear case 100-2, i.e., in the lower side of the mobile terminal 100, so as to collect an audio signal Referring to FIG. 1B, a second camera 195b, a third camera 195c, and a fourth microphone 123d may be additionally mounted on the rear surface of the rear case 100-2, and a sixth and seventh user input units 130f and 130g, and an interface 175 may be disposed on the side surface of the rear case 100-2.

The second camera 195b has a photographing direction substantially opposite to that of the first camera 195a, and may have different pixels from the first camera 195a. A flash (not shown) and a mirror (not shown) may be additionally disposed adjacent to the second camera 195b. In addition, another camera may be installed adjacent to the second camera 195b to be used for shooting a three-dimensional stereoscopic image.

The second camera 195b may have a photographing direction substantially opposite to that of the first camera 195a, and may have different pixels from the first camera 195a. A flash (not shown) and a mirror (not shown) may be additionally disposed adjacent to the second camera 195b. In addition, another camera may be installed adjacent to the second camera 195b to be used for photographing a three-dimensional stereoscopic image.

A second sound output module (not shown) may be additionally disposed in the rear case 100-2. The second sound output module may implement a stereo function together with the first sound output module 153a, and may be used for talking in a speakerphone mode.

A power supply unit 190 for supplying power to the mobile terminal 100 may be mounted in the rear case 100-2. The power supply unit 190 may be, for example, a rechargeable battery and may be detachably coupled to the rear case 100-2 for charging or the like.

The fourth microphone 123d may be disposed in the front surface of the rear case 100-2, i.e., in the rear surface of the mobile terminal 100 so as to collect an audio signal.

Figure 2:
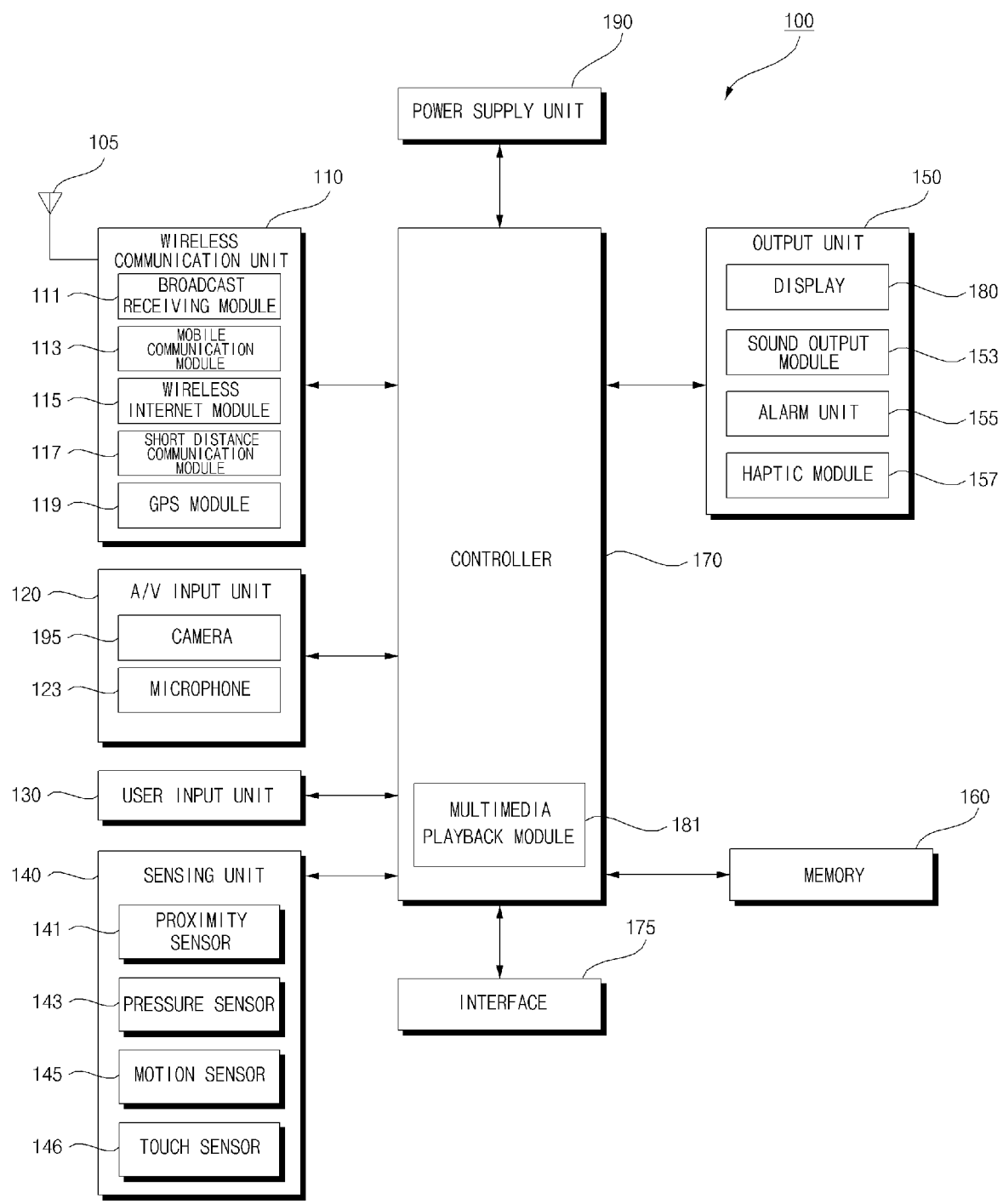
FIG. 2 is a block diagram of the mobile terminal of FIG. 1.

FIG. 2 is a block diagram of the mobile terminal of FIG. 1.

Referring to FIG. 2, the mobile terminal 100 may include a wireless communication unit 110, an audio/video (A/V)

input unit 120, a user input unit 130, a sensing unit 140, an output unit 150, a memory 160, an interface 175, a controller 170, and a power supply unit 190. When these components are implemented in an actual application, two or more components may be combined into one component if necessary, or one component may be divided into two or more components.

The wireless communication unit 110 may include a broadcast receiving module 111, a mobile communication module 113, a wireless Internet module 115, a short-range communication module 117, and a GPS module 119.

The broadcast receiving module 111 may receive at least one of a broadcast signal and broadcast related information from an external broadcast management server through a broadcast channel. The broadcast signal and/or broadcast related information received through the broadcast receiving module 111 may be stored in the memory 160.

The mobile communication module 113 may transmit and receive a wireless signal to at least one of a base station, an external terminal, and a server on a mobile communication network. Here, the wireless signal may include various types of data in accordance with a voice call signal, a video call signal, or a character/multimedia message transmission/reception.

The wireless Internet module 115 refers to a module for wireless Internet access, and the wireless Internet module 115 may be embedded in the mobile terminal 100 or externally provided.

The short-range communication module 117 refers to a module for short-range communication. Bluetooth, Radio Frequency Identification (RFID), infrared Data Association (IrDA), Ultra Wideband (UWB), ZigBee, and Near Field Communication (NFC) may be used as a short-range communication technology.

The Global Position System (GPS) module 119 may receive position information from a plurality of GPS satellites.

The audio/video (A/V) input unit 120 may be used to input an audio signal or a video signal, and may include the camera 195, the microphone 123, and the like. The camera 195 may process an image frame such as a still image or a moving image obtained by an image sensor in a video call mode or a photographing mode. Then, the processed image frame may be displayed on the display 180.

The image frame processed by the camera 195 may be stored in the memory 160 or transmitted to the outside through the wireless communication unit 110. Two or more cameras 195 may be provided according to the configuration of the terminal.

The microphone 123 may receive an external audio signal by the microphone in a display off mode, e.g., a call mode, a recording mode, or a voice recognition mode, and may process the audio signal into an electrical voice data.

Meanwhile, a plurality of microphones 123 may be disposed in different positions. The audio signal received in each microphone may be audio-signal processed in the controller 170, or the like.

The user input unit 130 may generate key input data that the user inputs for controlling the operation of the terminal. The user input unit 130 may include a key pad, a dome switch, and a touch pad (static pressure scheme/capacitive scheme) capable of receiving a command or information by a user's pressing or touching operation. In particular, when the touch pad has a mutual layer structure with the display 180 described later, it may be referred to as a touch screen.

The sensing unit 140 may detect the current state of the mobile terminal 100 such as the open/close state of the mobile terminal 100, the position of the mobile terminal 100, the contact of the user, and the like, and may generate a sensing signal for controlling the operation of the mobile terminal 100.

The sensing unit 140 may include a proximity sensor 141, a pressure sensor 143, a motion sensor 145, a touch sensor 146, and the like.

The proximity sensor 141 may detect an object approaching the mobile terminal 100 or an object in the vicinity of the mobile terminal 100 without mechanical contact. In particular, the proximity sensor 141 may detect a nearby object by using a change in the alternating magnetic field or a change in the static magnetic field, or by using a change rate of the capacitance.

The pressure sensor 143 may detect whether a pressure is applied to the mobile terminal 100, or detect the magnitude of the pressure, and the like.

The motion sensor 145 may detect the position or motion of the mobile terminal 100 by using an acceleration sensor, a gyro sensor, or the like.

The touch sensor 146 may detect a touch input by a user's finger or a touch input by a specific pen. For example, when a touch screen panel is disposed on the display 180, the touch screen panel may include a touch sensor 146 for detecting position information and intensity information of the touch input. A sensing signal detected by the touch sensor 146 may be transmitted to the controller 180.

The output unit 150 may be used to output an audio signal, a video signal, or an alarm signal. The output unit 150 may include a display 180, an sound output module 153, an alarm unit 155, and a haptic module 157.

The display 180 may display and output information processed by the mobile terminal 100. For example, when the mobile terminal 100 is in the call mode, a user interface (UI) or graphic user interface (GUI) related with the call may be displayed. When the mobile terminal 100 is in the video call mode or the photographing mode, the photographed or received image may be displayed individually or simultaneously, and the UI and the GUI may be displayed.

Meanwhile, as described above, when the display 180 and the touch pad form a mutual layer structure to constitute a touch screen, the display 180 may be used as an input apparatus capable of inputting information by a user's touch in addition to an output apparatus.

The sound output module 153 may output the audio data received from the wireless communication unit 110 or stored in the memory 160 in a call signal reception, a call mode or a recording mode, a voice recognition mode, a broadcast reception mode, and the like. The sound output module 153 may output an audio signal related to the function performed in the mobile terminal 100, e.g., a call signal reception tone, a message reception tone, and the like. The sound output module 153 may include a speaker, a buzzer, and the like.

The alarm unit 155 may output a signal for notifying the occurrence of an event of the mobile terminal 100. The alarm unit 155 may output a signal for notifying the occurrence of an event in a form other than an audio signal or a video signal. For example, it is possible to output a signal in a form of vibration.

The haptic module 157 may generate various tactile effects that the user can feel. A typical example of the tactile effect generated by the haptic module 157 may be a vibration effect. When the haptic module 157 generates vibration with a tactile effect, the intensity and pattern of the vibration generated by the haptic module 157 can be converted, and different vibrations may be synthesized and outputted or sequentially outputted.

The memory 160 may store a program for the processing and controlling of the controller 170, and may serve to temporarily store inputted or outputted data (e.g., a phone book, a message, a still image, a moving image, or the like).

The interface 175 may serve as an interface with all external devices connected to the mobile terminal 100. The interface 175 may receive data from an external device or receive power from the external device to transmit to each component in the mobile terminal 100, and allow the data in the mobile terminal 100 to be transmitted to the external device.

The controller 170 may control, in general, the operation of each unit to control the overall operation of the mobile terminal 100. For example, the controller 170 may perform relevant control and processing for voice call, data communication, video call, and the like. In addition, the controller 170 may include a multimedia play module 181 for playing multimedia. The multimedia play module 181 may be configured in hardware inside the controller 170 or may be configured in software separately from the controller 170. Meanwhile, the controller 170 may include an application processor (not shown) for driving an application. Alternatively, the application processor (not shown) may be provided separately from the controller 170.

The power supply unit 190 may receive external power or internal power under the control of the controller 170 to supply power required for operation of each component.

Figure 3A:
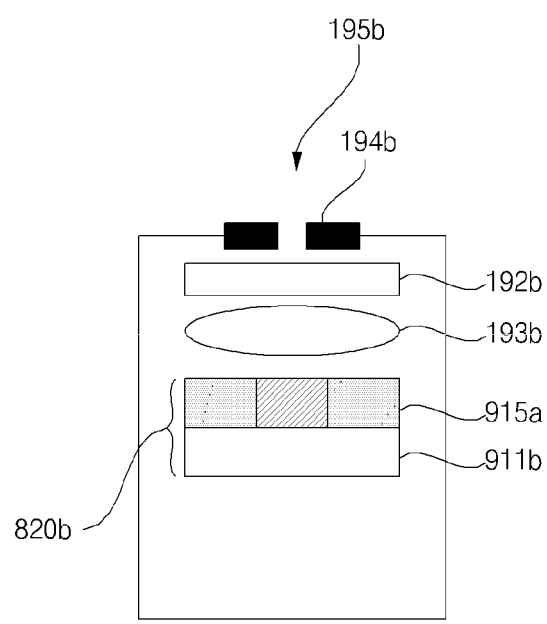
FIG. 3A is an internal cross-sectional view of the camera of FIG. 2.

FIG. 3A is an internal cross-sectional view of the camera of FIG. 2.

Referring to the drawing, FIG. 3A is an example of a cross-sectional view of a second camera 195*b* inside the camera 195.

The second camera 195*b* may include an aperture 194*b*, a prism structure 192*b*, a lens structure 193*b*, and an image sensor 820*b*.

The aperture 194*b* may open and close the light incident on the lens structure 193*b*.

The image sensor 820*b* may include an RGB filter 915*b*, and a sensor array 911*b* for converting an optical signal into an electric signal, in order to sense RGB colors.

Accordingly, the image sensor 820*b* may sense and output RGB images, respectively.

Figure 3B:
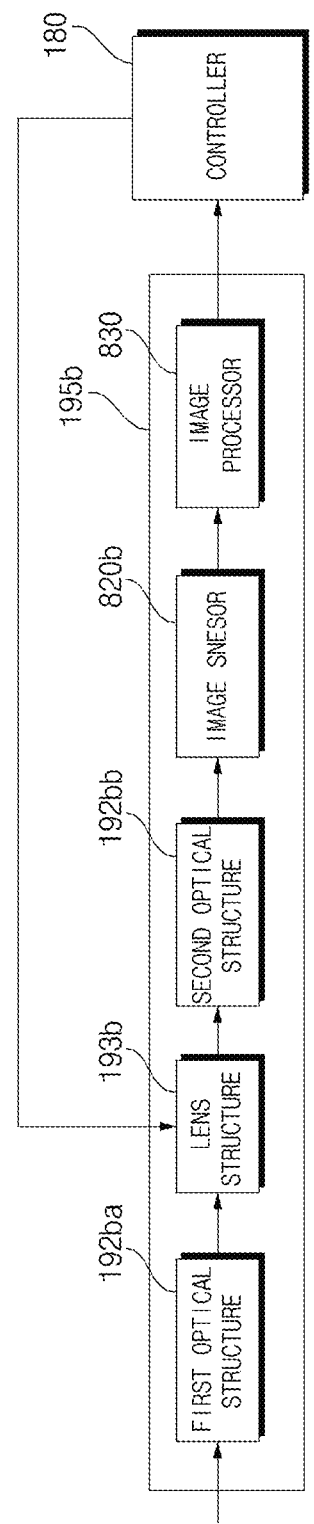
FIG. 3B is an internal block diagram of the camera of FIG. 2.

FIG. 3*b* is an internal block diagram of the camera shown in FIG. 2.

Referring to the drawing, FIG. 3B is an example of a block diagram of the second camera 195*b* in the camera 195.

The second camera 195*b* may include a first optical structure 192*ba*, a lens structure 193*b*, a second optical structure 192*bb*, an image sensor 820*b*, and an image processor 830 according to a light transmitting order.

The image processor 820 may generate an RGB image based on an electric signal from the image sensor 820*b*.

Meanwhile, the image sensor 820*b* may adjust an exposure time based on the electric signal.

Meanwhile, the RGB image generated by the image processor 830 may be transferred to the controller 170 of the mobile terminal 100.

Meanwhile, the controller 170 of the mobile terminal 100 may output a control signal to the lens structure 193*b* for movement of a lens in the lens structure 193*b*. For example, a control signal for autofocusing may be output to the lens structure 193*b*.

Meanwhile, a thickness of the camera is determined by how the first optical structure 192*ba*, the lens structure 193*b*, and the second optical structure 192*bb* are structured, and accordingly, various designs may be possible.

Figure 4A:
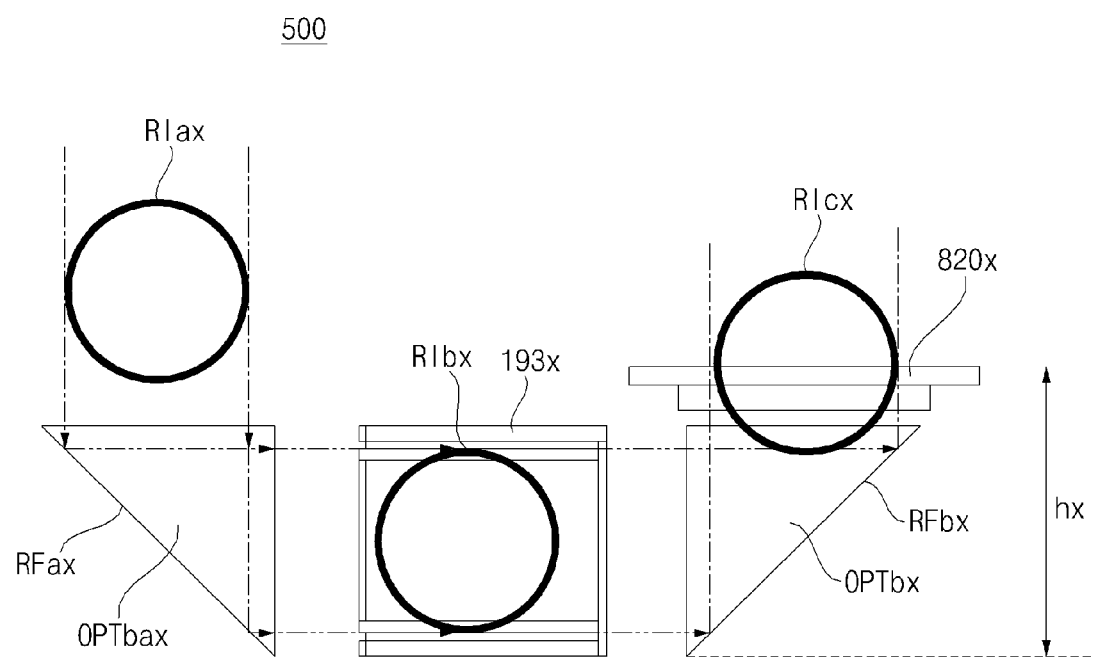
FIGS. 4A to 4C are diagrams illustrating an existing camera structure.
Figure 4B:
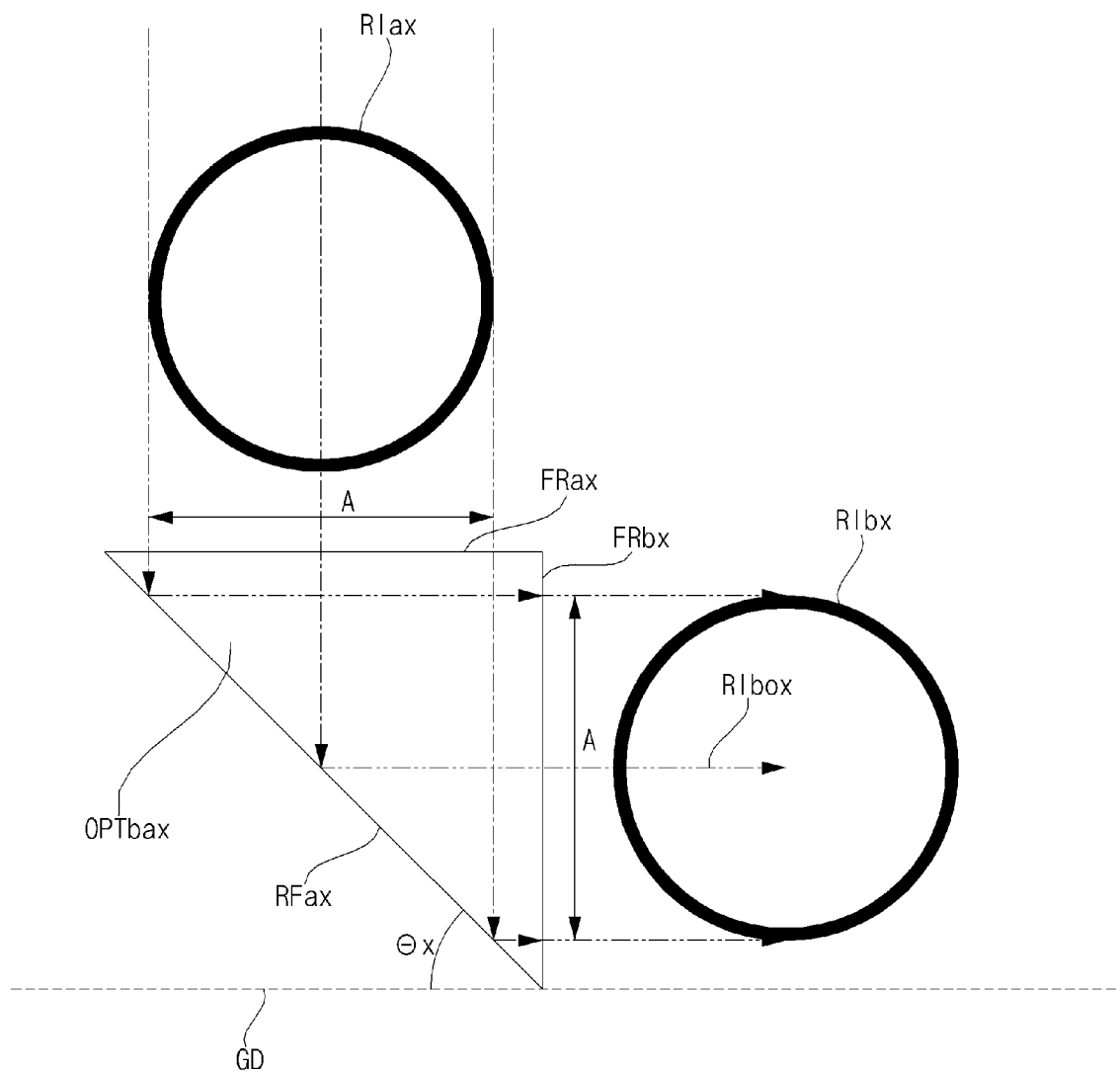
Figure 4C:
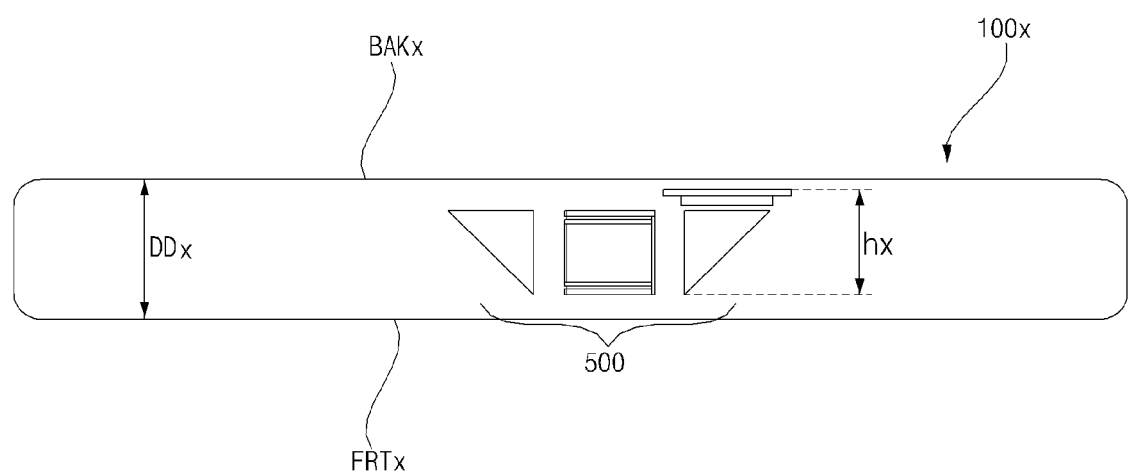

FIGS. 4A to 4C are diagrams illustrating an existing camera structure.

First, referring to FIGS. 4A and 4B, an existing camera 500 may include a first prism OPTbax which reflects a first beam Rlax being input, a second prism OPTbx which reflects a second beam Rlbx from the first prism OPTbax, and a lens structure 193*x* which is disposed between the first prism OPTbax and the second prism OPTbx and includes a plurality of lens, at least one of which is moved to achieve variable focus.

The first beam Rlax is incident on a light incident surface FRAx of the first prism OPTbax, the first beam Rlax is reflected by a reflection surface RFax of the first prism OPTbax, and the second beam Rlbx is output from a light exit surface FRbx of the first prism OPTbax.

In this case, a width A of the first beam Rlax and a width of the second beam Rlbx are identical to each other.

Meanwhile, an angle θx formed by the reflection surface RFax of the first prism OPTbax and the second beam Rlbx, or an angle θx formed by an orthogonal surface GD orthogonal to the first beam Rlax and the first reflection surface RFax is approximately 45°.

That is, as shown in FIG. 4A or 4B, if the first beam Rlax is a circular beam, the second beam Rlbx is maintained to be a circular beam as well.

Similarly, the second prism OPTbx reflects the second beam Rlbx on the reflection surface RFbx to output a third beam Rlcx. In this case, the width A of the second beam Rlbx and a width A of the third beam Rlcx are identical to each other.

Accordingly, as shown in FIG. 4A or 4C, the first prism OPTbax, the second prism OPTbx, and the lens structure 193*x* may have the same thickness or height.

Meanwhile, FIG. 4C is a side view of a mobile terminal 100*x*, where BAKx indicates a rear case of the mobile terminal 100*x* and FRTx indicates a front case of the mobile terminal 100*x*.

A camera 500 disposed inside the mobile terminal 100*x* has a considerable thickness hx, as shown in FIG. 4C, and a thickness of the mobile terminal 100*x* is indicated as DDx.

Meanwhile, in the present invention, unlike the examples of FIGS. 4A to 4C, a method of reducing a thickness of a camera is proposed. In particular, a method of reducing a thickness of a camera based on beam shaping is proposed. Regarding this, detailed description will be provided from FIG. 5A.

Figure 5A:
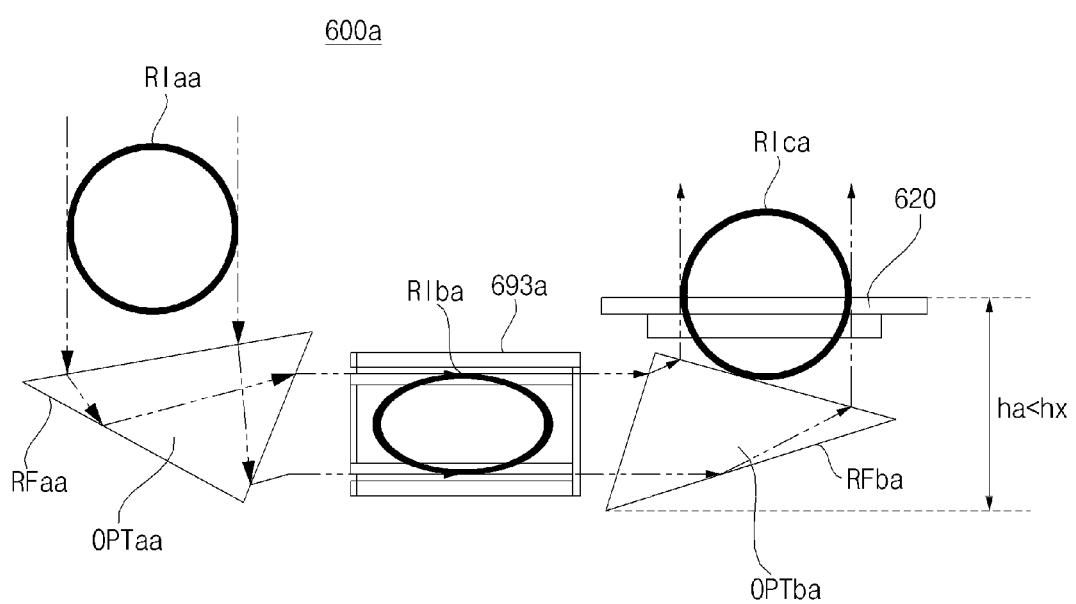
FIG. 5A to 5C are diagrams illustrating a camera structure according to an embodiment of the present invention.
Figure 5B:
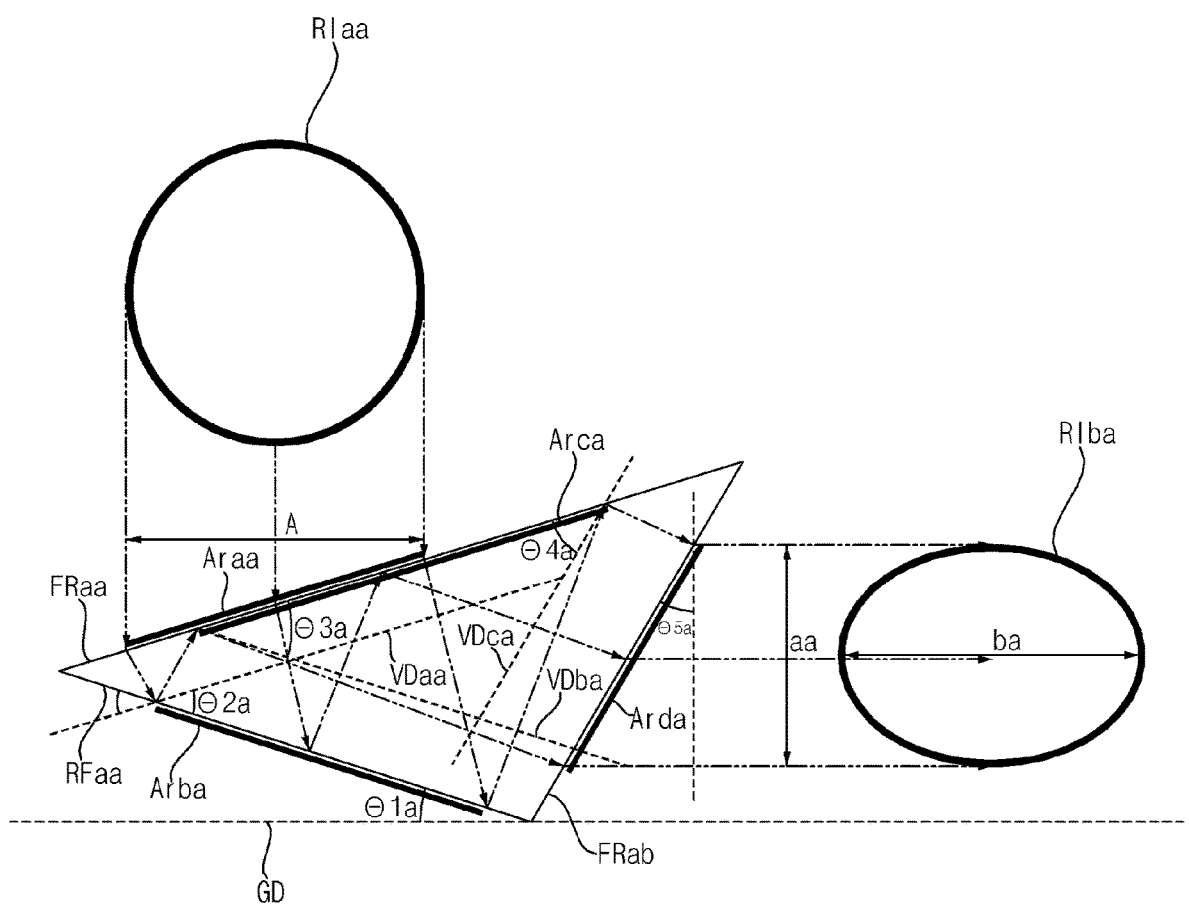
Figure 5C:
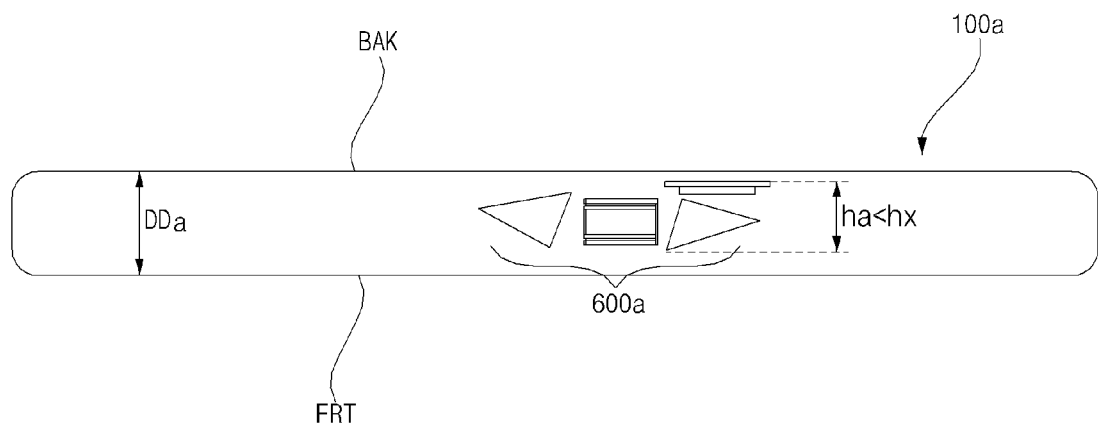

FIGS. 5A to 5C are diagrams illustrating a camera structure according to an embodiment of the present invention.

First, FIG. 5A is a diagram illustrating a structure of a camera 600*a* according to an embodiment of the present invention, FIG. 5B is a zoomed-in view of a first optical structure OPTaa shown in FIG. 5A, and FIG. 5C is a side view of a mobile terminal 100*a* including the camera shown in FIG. 5A.

Referring to the drawings, the camera 600*a* according to an embodiment of the present invention may include: a first optical structure OPTaa which refracts and reflects a first beam Rlaa being input to output a second beam Rlba with a width smaller than a width of the first beam Rlaa; and a second optical structure OPTba which refracts and reflects the second beam Rlba from the first optical structure OPTaa to output a third beam Rlca with a width greater than the width of the second beam Rlba.

Meanwhile, the first optical structure OPTaa may include a first reflection surface RFaa which reflects the first beam Rlaa, and it is desirable that an angle θ1a formed by the first reflection surface RFaa and the second beam Rlba or an angle θ1a formed by an orthogonal surface GD orthogonal to the first beam Rlaa and the first reflection surface RFaa is greater than 0° and smaller than 45°.

Unlike FIGS. 4A to 4C in which the angle θx formed by the reflection surface RFax of the first prism OPTbax of the camera 500 and the second beam Rlbx or the angle θx formed by the orthogonal surface GD orthogonal to the first beam Rlax and the first reflection surface RFax is approximately 45°, the present invention is desired such that the angle θ1a formed by the first reflection surface RFaa and the second beam Rlba or the angle θ1a formed by the orthogonal surface GD orthogonal to the first beam Rlaa and the first reflection surface RFaa is greater than 0° and smaller than 45°.

According to such a design, an angle between the first reflection surface RFaa of the first optical structure OPTaa and a rear surface of a rear case 100-2 is greater than 0° and smaller than 45°, and thus, not just a thickness of the first optical structure OPTaa but a thickness of a lens structure 693a may be reduced.

Therefore, it is possible to reduce a thickness ha of a camera 600a including the first optical structure OPTaa, the lens structure 693a, and the second optical structure OPTba.

In addition, according to a structure of the camera 600a, if the first beam Rlaa is a circular beam, beam shaping is performed such that the second beam Rlba is an elliptical beam. In particular, since a width of the second beam Rlba becomes smaller than a width of the first beam Rlaa, it is possible to reduce the thickness of the camera 600a.

In particular, the thickness ha of the camera 600a shown in FIGS. 5A to 5C may be smaller than the thickness hx of the existing camera 500 shown in FIGS. 4A to 4C.

Thus, as shown in FIG. 5C, a thickness DDa of a mobile terminal including the camera 600a with a reduced thickness may be smaller than the thickness DDx shown in FIG. 4C. Thus, it is possible to implement a slim mobile terminal.

Meanwhile, the first optical structure OPTaa may be implemented as a prism, as shown in FIGS. 5A to 5C.

The first beam Rlaa is refracted by the light incident surface FRaa of the first optical structure OPTaa, that is, the first prism OPTaa, the first beam Rlaa is reflected by the reflection surface FRaa of the first prism OPTaa, and the first beam Rlaa is refracted by the light exit surface FRab of the first prism OPTaa such that the second beam Rlba is output in a direction toward the lens structure 693a.

FIGS. 5A and 5B illustrates an example in which the first prism OPTaa is inclined such that an angle between the reflection surface RFaa of the first prism OPTaa and an orthogonal surface GD orthogonal to the first beam Rlaa is greater than 0° and smaller than 45°.

Meanwhile, the first beam Rlaa may be refracted by the light incident surface FRaa of the first prism OPTaa, reflected by the reflection surface RFaa of the first prism OPTaa, reflected by the light incident surface FRaa of the first prism OPTaa, and then refracted by the light exit surface FRab of the first prism OPTaa.

Accordingly, a width of the first beam Rlaa incident on the light incident surface FRaa of the first prism OPTaa is A, and a width of the second beam Rlba output from the light exit surface FRab of the first prism OPTaa is aa which is smaller than A.

In the present invention, in order to implement a slim camera, a ratio of a width aa of the second beam Rlba to the width A of the first beam Rlaa is designed to be greater than 0.5 and smaller than 1. Accordingly, a thickness of the camera 600a may be reduced.

Meanwhile, if the first beam Rlaa is a circular beam, beam shaping may be performed such that the second beam Rlba is an elliptical beam and the third beam Rlca is a circular beam. Accordingly, a thickness of the camera 600a may be reduced.

Meanwhile, referring to FIG. 5B, cos(θ1a) may be calculated as A/Araa, cos(θ2a) may be calculated as Araa/Arba, cos(θ3a) may be calculated as Arba/Arca, cos(θ4a) may be calculated as Arca/Arda, and cos(θ5a) may be calculated as Arda/aa.

Meanwhile, a height of the first optical structure OPTaa may be smaller than width A of the first beam Rlaa. Accordingly, a width of the camera 600a may be reduced based on beam shaping.

Meanwhile, similarly to the first optical structure OPTaa, the second optical structure OPTba may include a second reflection surface RFba which reflects the second beam Rlba.

In addition, an angle between the second reflection surface RFba of the second optical structure OPTba and the second beam Rlba or an angle between the orthogonal surface GD orthogonal to the third beam Rlca and the second reflection surface RFba may be desired to be greater than 0° and smaller than 45°. Accordingly, it is possible to reduce even a thickness of the second optical structure OPTba.

In particular, it is desirable that the angle between the second reflection surface RFba of the second optical structure OPTba and the second beam Rlba or the angle between the orthogonal surface GD orthogonal to the third beam Rlca is identical to the angle θ1a formed by the first reflection surface RFaa of the first optical structure OPTaa and the second beam Rlba or the angle θ1a formed by the orthogonal surface GD orthogonal to the third beam Rlaa and the first reflection surface RFaa. Accordingly, a thickness of the camera 600a may be reduced with the first optical structure OPTaa and the second optical structure OPTba maintained at the same thickness.

Meanwhile, the second optical structure OPTba may be implemented as a prism, as shown in FIGG. 5A to 5C.

Accordingly, it is desirable that the angle between the second reflection surface RFba of the second prism OPTba and the second beam Rlba or the angle between the orthogonal surface GD orthogonal to the third beam Rlca and the second reflection surface RFba of the second prism OPTba is greater than 0° and smaller than 45°.

Meanwhile, the second beam Rlba is refracted by a light incident surface of the second optical structure OPTba, that is, the second prism OPTba, the second beam Rlba is reflected by a reflection surface RFba of the second prism OPTba, and the second beam Rlba is refracted by a light exit surface of the second prism OPTba such that the third beam Rlca is output in a direction toward the lens structure 693a.

In this case, the third beam Rlca is subject to beam shaping, and, if the second beam Rlba is an elliptical beam, the third beam Rlca may be a circular beam. Accordingly, the third beam Rlca from which beam distortion has been removed may be input to an image sensor 620. Thus, it is possible to take a photograph without distortion.

Meanwhile, FIG. 5C is a side view of the mobile terminal 100a, where BAk indicates a rear case of the mobile terminal 100a (which corresponds to 100-2 in FIG. 1B) and FRT indicates a front case of the mobile terminal 100a (which corresponds to 100-1 in FIG. 1B).

The camera 600a disposed in the mobile terminal 100a has a slim thickness of ha, as shown in FIG. 5C, and thus, even the mobile terminal 100a may be implemented with a slim thickness of DDa.

Meanwhile, a height of the first optical structure OPTaa decreases as the angle θ1a formed by the first reflection surface RFaa of the first optical structure OPTaa and the second beam Rlba or the angle θ1a formed by the orthogonal surface GD orthogonal to the first beam Rlaa and the first reflection surface RFaa becomes closer to 0°. The height of the first optical structure OPTaa increases as the angle θ1a formed by the first reflection surface RFaa of the first optical structure OPTaa and the second beam Rlba or the angle θ1a formed by the orthogonal surface GD orthogonal to the first beam Rlaa and the first reflection surface RFaa becomes closer to 45°. Regarding this, detailed description will be provided with reference to FIGS. 6A to 7C.

Figure 6A:
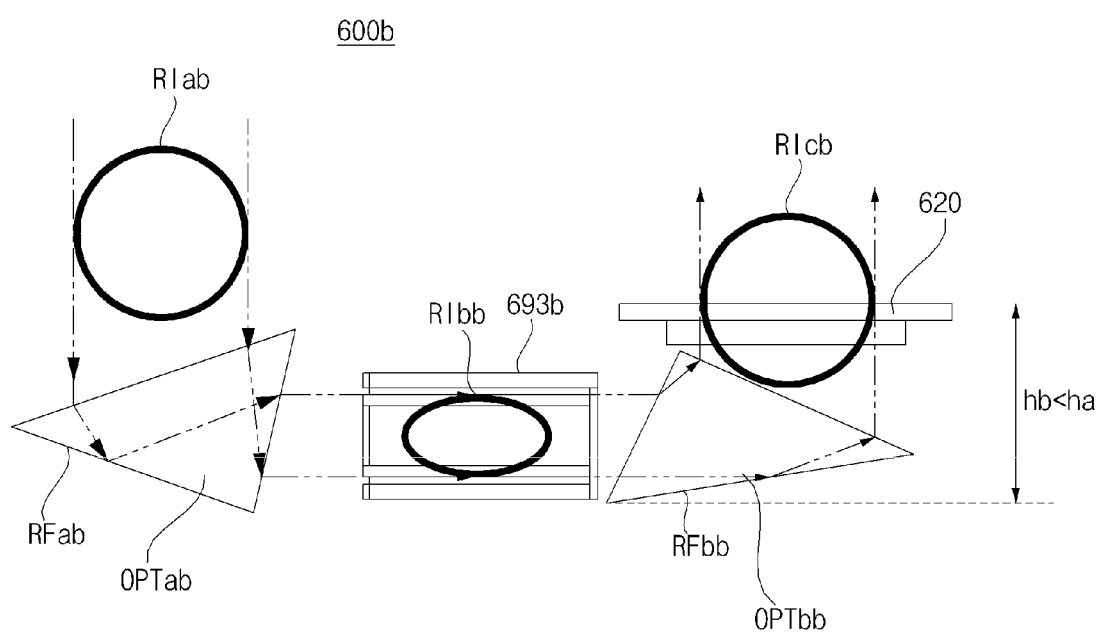
FIGS. 6A to 6C are diagrams illustrating a camera structure according to another embodiment of the present invention.
Figure 6B:
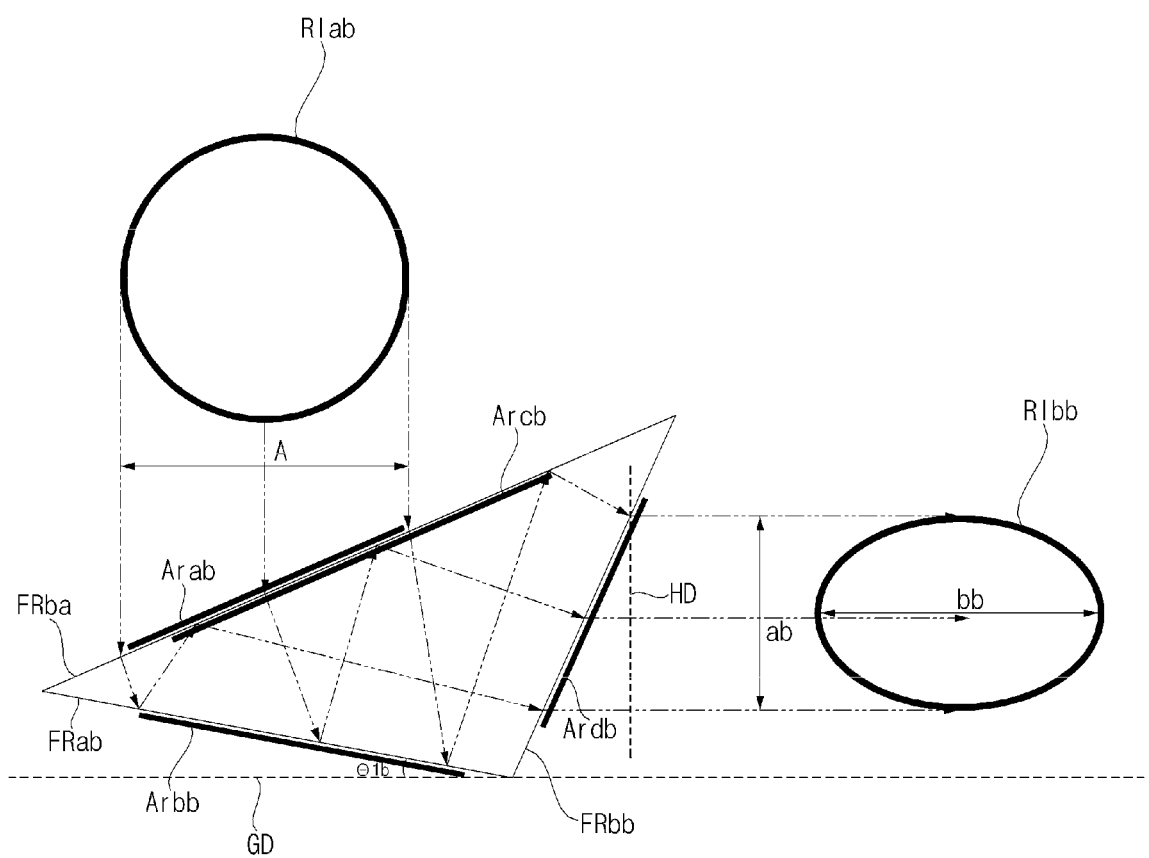
Figure 6C:
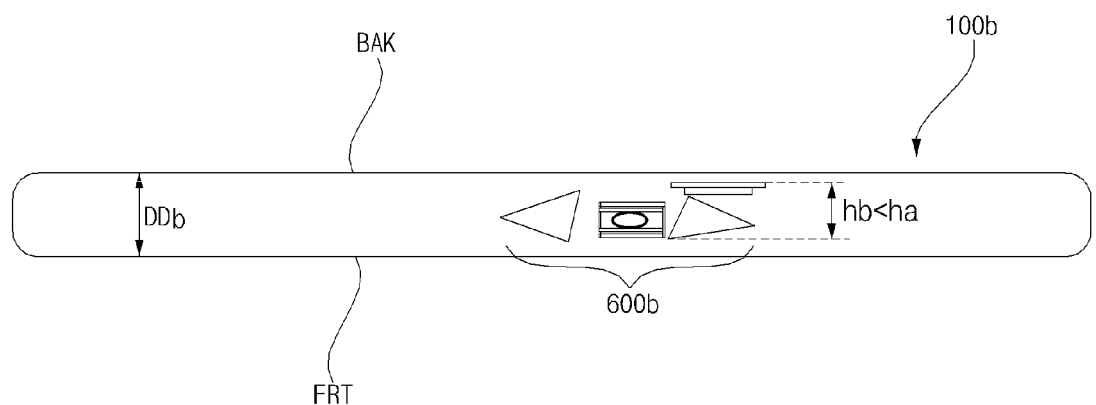

FIGS. 6A to 6C are diagrams illustrating a camera structure according to another embodiment of the present invention.

A camera 600b and a mobile terminal 100b including the same shown in FIGS. 6A to 6C are similar to the camera 600a and the mobile terminal 100a shown in FIGS. 5A to 5C, but FIGS. 6A to 6C illustrates an example in which an angle θ1b formed by a first reflection surface RFab of a first optical structure OPTab and a second beam Rlbb or an angle θ1b formed by an orthogonal surface GD orthogonal to the first beam Rlab and the first reflection surface RFab is smaller than the angle θ1a in FIGS. 5A to 5C.

Accordingly, a width of the first beam Rlab incident on a light incident surface FRba of a first prism OPTab is A, and a width of a second beam RLbb output from a light exit surface FRbb of the first prism OPTab is ab which is smaller than aa.

In particular, the width of the second beam Rlbb is ab which is smaller than aa in the example of FIGS. 5A and 5C.

Thus, a width hb of the camera 600b in FIGS. 6A to 6C is smaller than the thickness ha of the camera 600a in FIGS. 5A to 5C.

As a result, a thickness DDb of the mobile terminal 100b is smaller than the thickness DDa of the mobile terminal 100a shown in FIG. 5c.

Figure 7A:
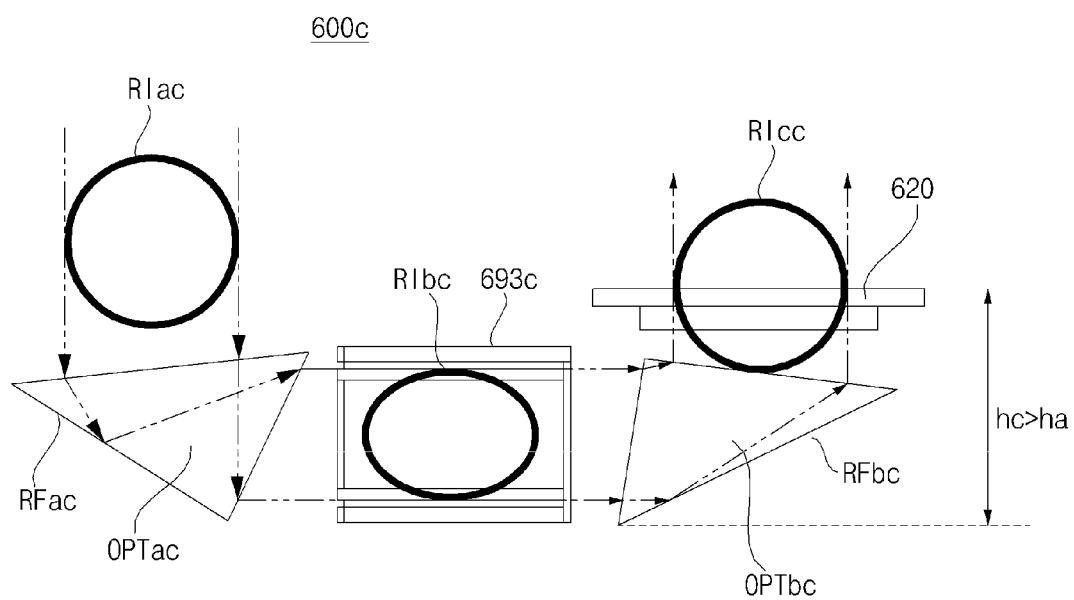
FIGS. 7A to 7C are diagrams illustrating a camera structure according to yet another embodiment of the present invention.
Figure 7B:
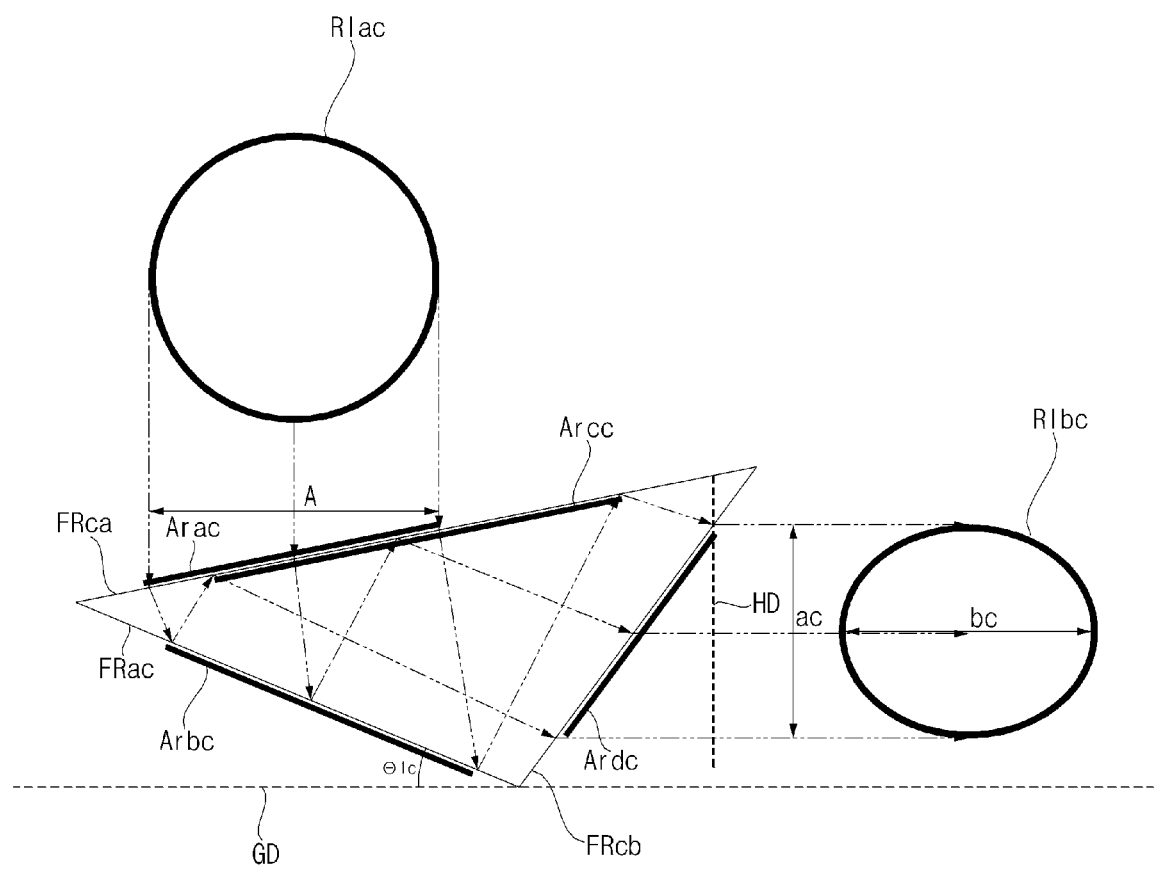
Figure 7C:
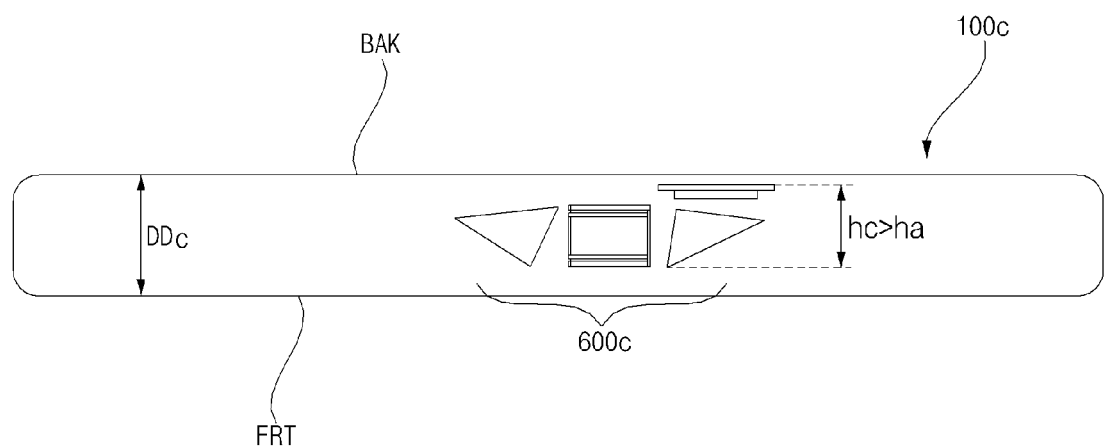

FIGS. 7A to 7C are diagrams illustrating a camera structure according to yet another embodiment of the present invention.

A camera 600c and a mobile terminal 100c including the same in FIGS. 7A to 7C are similar to the camera 600a and the mobile terminal 100a in FIGS. 5A to 5C, but FIGS. 7A to 7C illustrate an example in which an angle θ1c formed by a first reflection surface RFac of a first optical structure OPTac and a second beam Rlbc or an angle θ1c formed by an orthogonal surface GD orthogonal to a first beam Rlac and the first reflection surface RFac is smaller than the angle θ1a in FIGS. 5A to 5C.

Accordingly, a width of the first beam Rlac incident on a light incident surface FRca of the first prism OPTac is A, and a width of the second beam Rlbc output from a light exit surface FRcb of the first prism OPTac is ac which is smaller than A.

In particular, the width of the second beam Rlbc is ac which is smaller than aa in the example of FIGS. 5A to 5C.

Thus, a thickness hc of the camera 600c shown in FIGS. 7A to 7C may be greater than the thickness ha of the camera 600a shown in FIGS. 5A to 5C or smaller than the thickness hx of the camera 500 shown in FIGS. 4A to 4C.

As a result, a thickness DDc of the mobile terminal 100c is greater than the thickness DDa of the mobile terminal 100a shown in FIG. 5C, but smaller than the thickness DDx of the mobile terminal 100x shown in FIG. 4C.

Figure 8A:
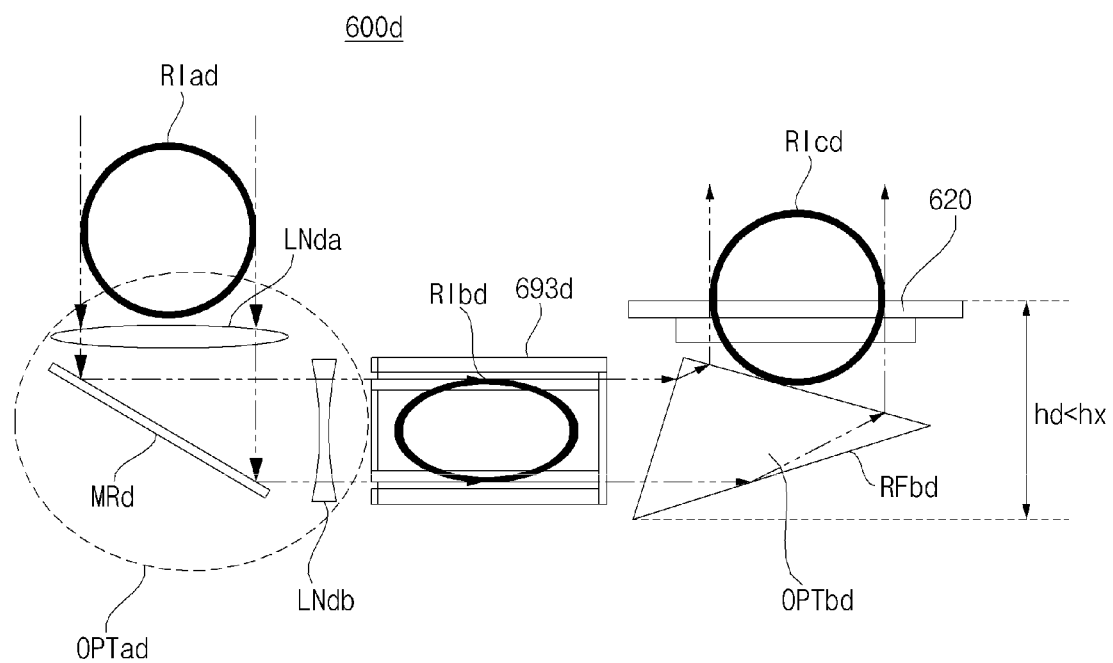
FIGS. 8A to 8C are diagrams illustrating a camera structure according to yet another embodiment of the present invention.
Figure 8B:
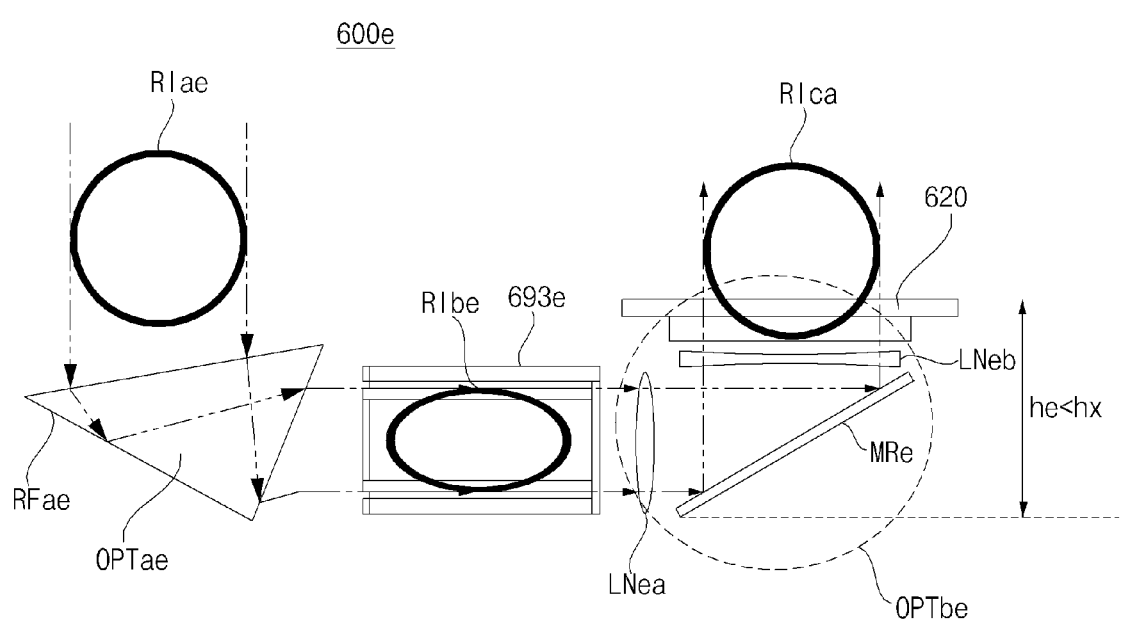
Figure 8C:
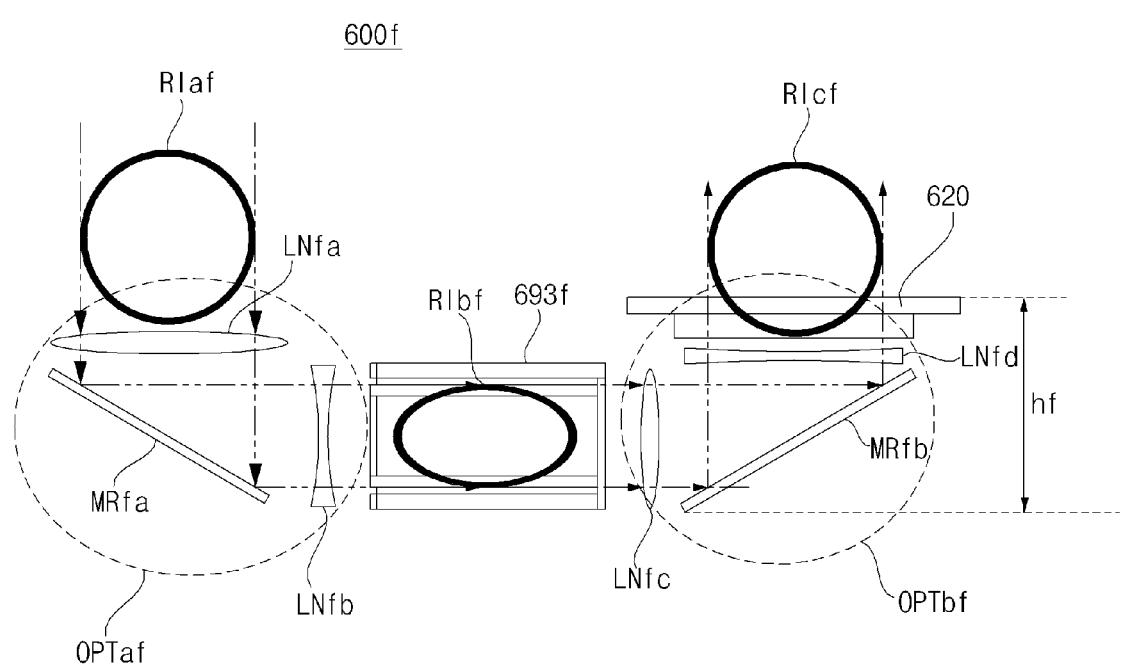

FIGS. 8A to 8C are diagrams illustrating a camera structure according to yet another embodiment of the present invention.

First, FIG. 8A illustrates an example in which a first optical structure OPTad includes, a first convex lens LNda, a first mirror Mrd, and a first concave lens LNdb, rather than including a prism.

A first beam Rlad is refracted by the first convex lens LNda, the first beam Rlad is reflected by the first mirror Mrd, and the first beam Rlad is refracted by the first concave lens LNdb such that a second beam Rlbd is output in a direction toward a lens structure 693d.

Meanwhile, it is desirable that an angle between the first mirror Mrd and the second beam Rlbd or an angle between an orthogonal surface GD orthogonal to the first beam Rlad and the first mirror Mrd is greater than 0° and smaller than 45°.

Meanwhile, FIG. 8A illustrates an example in which a second optical structure OPTbd is implemented as a prism.

Accordingly, it is desirable that an angle between a second reflection surface RFbd of the second prism OPTbd and the second beam Rlbd or an angle between an orthogonal surface GD orthogonal to the third beam Rlcd and the second reflection surface RFbd of the second prism OPTbd is greater than 0° and smaller than 45°.

Next, FIG. 8B illustrates an example in which a second optical structure OPTbe includes a second convex lens LNea, a second mirror Mre, and a second concave lens LNeb, rather than including a prism.

Meanwhile, FIG. 8B illustrates an example in which a first optical structure OPTae is implemented as a prism.

Accordingly, it is desirable that an angle between a first reflection surface RFae of the first prism OPTae and a second beam Rlbe or an angle between an orthogonal surface GD orthogonal to a first beam Rlae and the first reflection surface RFae of the first prism OPTae is greater than 0° and smaller than 45°.

Meanwhile, the second beam Rlbe is refracted by the second convex lens LNea, the second beam Rlbe is reflected by the second mirror Mre, and the second beam Rlbe is refracted by the second concave lens LNeb such that a third beam Rlce is output in a direction toward an image sensor 620.

Meanwhile, it is desirable that the angle between the second mirror Mre and the second beam Rlbe or an angle between an orthogonal surface GD orthogonal to the third beam Rlce and the second mirror Mre is greater than 0° and smaller than 45°.

Next, FIG. 8C illustrates an example in which a first optical structure OPTaf includes a first convex lens LNfa, a first mirror Mrfa, and a first concave lens LNfb, rather than including a prism, and a second optical structure OPTbf includes a second convex lens LNfc, a second mirror Mrfb, and a second concave lens LNfd, rather than including a prism.

A first beam Rlaf is refracted by the first convex lens LNfa, the first beam Rlaf is reflected by the first mirror Mrfa, and the first beam Rlaf is refracted by the first concave lens LNfb such that a second beam Rlbf is output in a direction toward a lens structure 693f.

Meanwhile, it is desirable that an angle between the first mirror Mrfa and the second beam Rlbf or an angle between an orthogonal surface Gf orthogonal to the first beam Rlaf and the first mirror Mrfa is greater than 0° and smaller than 45°.

Meanwhile, the second beam Rlbf is refracted by the second convex lens LNfc, the second beam Rlbf is reflected by the second mirror Mrfb, and the second beam Rlbf is refracted by the second concave lens LNfd such that a third beam Rlcf is output in a direction toward an image sensor 620.

Meanwhile, an angle between the second mirror Mrfb and the second beam Rlbf or an angle between an orthogonal surface GD orthogonal to the third beam Rlcf and the second mirror Mrfb is greater than 0° and smaller than 45°.

Meanwhile, the cameras 600a to 600f described with references to FIGS. 5A to 8C may be applied to various electronic devices including the mobile terminal 100 in FIG. 2, a vehicle, a TV, a drone, a robot, a robot cleaner, etc.

As is apparent from the above description, a camera according to an embodiment of the present invention comprises: a first optical structure configured to refract and reflect a first input beam to output a second beam with a width smaller than a width of the first input beam; and a second optical structure configured to refract and reflect the second beam from the first optical structure to output a third beam with a width greater than the width of the second beam, wherein the first optical structure comprises a first reflection surface configured to reflect the first input beam, and wherein a first angle between the first reflection surface and the second beam and a second angle between an orthogonal surface orthogonal to the first input beam and the first reflection surface are each greater than 0° and smaller than 45°. Accordingly, a thickness of the camera may be reduced.

Meanwhile, a height of the first optical structure is based on the angle between the first reflection surface and the orthogonal surface, such that the height is increased as the angle approaches 0° the height is decreased as the angle approaches 45. Accordingly, a thickness of the camera may be reduced.

A height of the first optical structure is smaller than the width of the first input beam. Accordingly, a thickness of the camera may be reduced.

When the first beam is circular, the second beam is elliptical and the third beam is circular. Accordingly, a thickness of the camera may be reduced.

A ratio of the width of the second beam to the width of the first input beam is greater than 0.5 and smaller than 1. Accordingly, a thickness of the camera may be reduced.

The first optical structure comprises a first prism which comprises the first reflection surface. Accordingly, a thickness of the camera may be reduced.

The first beam may be refracted by a first light incident surface of the first prism, and the first beam may be refracted by a first light exit surface of the first prism. Accordingly, a thickness of the camera may be reduced.

The second optical structure may comprise a second reflection surface configured to reflect the second beam, and a third angle between the second reflection surface and the second beam and a fourth angle between an orthogonal surface orthogonal to the third beam and the second reflection surface are each greater than 0° and smaller than 45°. Accordingly, a thickness of the camera may be reduced.

The second optical structure may comprise a second reflection surface configured to reflect the second beam, and a third angle between the second reflection surface and the second beam and a fourth angle between an orthogonal surface orthogonal to the third beam and the second reflection surface are identical to the first angle between the first reflection surface and the second beam and the second angle between the orthogonal surface orthogonal to the first input beam and the first reflection surface. Accordingly, a thickness of the camera may be reduced.

The second optical structure may comprise a second prism, and a third angle between a second reflection surface of the second prism and the second beam and a fourth angle between an orthogonal surface orthogonal to the third beam and the second reflection surface of the second prism are each greater than 0° and smaller than 45°. Accordingly, a thickness of the camera may be reduced.

The first optical structure may include a first convex lens, a first mirror, and a first concave lens, and the first mirror comprises the first reflection surface. Accordingly, a thickness of the camera may be reduced.

The second optical structure may comprise a second convex lens, a second mirror, and a second concave lens, and a third angle between a second reflection surface of the second mirror and the second beam and a fourth angle between an orthogonal surface orthogonal to the third beam and the second reflection surface of the second mirror are each greater than 0° and smaller than 45°. Accordingly, a thickness of the camera may be reduced.

The camera may further include a lens structure disposed between the first optical structure and the second optical structure, wherein the lens structure comprises a plurality of lenses and at least one of the plurality of lenses is movable to achieve variable focus. Accordingly, a thickness of the camera may be reduced.

A camera according to another embodiment of the present invention comprises: a first optical structure configured to refract and reflect a first input beam to output a second beam with a width smaller than a width of the first input beam; and a second optical structure configured to refract and reflect a second beam from the first optical structure to output a third beam with a width greater than the width of the second beam, wherein a ratio of the width of the second beam to the width of the first input beam is greater than 0.5 and smaller than 1. Accordingly, a thickness of the camera may be reduced.

The first optical structure may comprise a first reflection surface to reflect the first input beam, and a first angle between the first reflection surface and the second beam and a second angle between an orthogonal surface orthogonal to the first input beam and the first reflection surface are each greater than 0° and smaller than 45°. Accordingly, a thickness of the camera may be reduced.

An image display apparatus according to an embodiment of the present invention comprises: a case; a display; a camera disposed at a rear of the case; and a controller configured to control the display to display an image captured by the camera, wherein the camera comprises: a first optical structure configured to refract and reflect a first input beam to output a second beam with a width smaller than a width of the first input beam; and a second optical structure configured to refract and reflect the second beam from the first optical structure to output a third beam with a width greater than the width of the second beam, wherein the first optical structure comprises a first reflection surface configured to reflect the first input beam, and wherein a first angle between the first reflection surface and the second beam, a second angle between an orthogonal surface orthogonal to the first input beam and the first reflection surface, and a third angle between the rear surface of the rear case and the first reflection surface are each greater than 0° and smaller than 45°. Accordingly, a thickness of the image display apparatus including the camera may be reduced.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A camera comprising:
a first optical structure configured to refract and reflect a first beam input from a first direction to output a second beam to a second direction with a width smaller than a width of the first beam; and
a second optical structure configured to refract and reflect the second beam from the first optical structure to output a third beam to the first direction with a width greater than the width of the second beam,
wherein a height of the first optical structure and a height of the second optical structure are the same,
wherein a width of the first beam and a width of the third beam are the same,
wherein the first optical structure comprises a first reflection surface configured to reflect the first beam, and
wherein a first angle between an orthogonal surface orthogonal to the first beam and the first reflection surface is greater than 0° and smaller than 45°.

2. The camera of claim 1, wherein:
a height of the first optical structure is based on the first angle between the first reflection surface and the orthogonal surface orthogonal to the first beam, and the height of the first optical structure is increased as the first angle approaches 0° and the height is decreased as the first angle approaches 45°.

3. The camera of claim 1, wherein a height of the first optical structure is smaller than the width of the first beam.

4. The camera of claim 1, wherein, when the first beam is circular, the second beam is elliptical and the third beam is circular.

5. The camera of claim 1, wherein a ratio of the width of the second beam to the width of the first beam is greater than 0.5 and smaller than 1.

6. The camera of claim 1, wherein the first optical structure comprises a first prism which comprises the first reflection surface.

7. The camera of claim 6, wherein:
the first beam is refracted by a first light incident surface of the first prism, and
the first beam is refracted by a first light exit surface of the first prism.

8. The camera of claim 1, wherein:
the second optical structure comprises a second reflection surface configured to reflect the second beam, and
a second angle between an orthogonal surface orthogonal to the third beam and the second reflection surface is greater than 0° and smaller than 45°.

9. The camera of claim 1, wherein:
the second optical structure comprises a second reflection surface configured to reflect the second beam, and
a second angle between an orthogonal surface orthogonal to the third beam and the second reflection surface is identical to the first angle between the orthogonal surface orthogonal to the first beam and the first reflection surface.

10. The camera of claim 1, wherein:
the second optical structure comprises a second prism, and
a second angle between an orthogonal surface orthogonal to the third beam and a second reflection surface of the second prism is greater than 0° and smaller than 45°.

11. The camera of claim 1, wherein:
the first optical structure comprises a first convex lens, a first mirror, and a first concave lens, and the first mirror comprises the first reflection surface.

12. The camera of claim 11, wherein:
the second optical structure comprises a second convex lens, a second mirror, and a second concave lens, and
a second angle between an orthogonal surface orthogonal to the third beam and a second reflection surface of the second mirror is greater than 0° and smaller than 45°.

13. The camera of claim 1, further comprising a lens structure disposed between the first optical structure and the second optical structure, wherein the lens structure comprises a plurality of lenses and at least one of the plurality of lenses is movable to achieve variable focus.

14. The camera of claim 1, further comprising an image sensor configured to convert light from the second optical structure into an electric signal corresponding to an image.

15. A camera comprising:
a first optical structure configured to refract and reflect a first beam to output a second beam with a width smaller than a width of the first beam; and
a second optical structure configured to refract and reflect the second beam from the first optical structure to output a third beam with a width greater than the width of the second beam,
wherein a height of the first optical structure and a height of the second optical structure are the same,
wherein a width of the first beam and a width of the third beam are the same,
wherein a ratio of the width of the second beam to the width of the first beam is greater than 0.5 and smaller than 1.

16. The camera of claim 15, wherein:
the first optical structure comprises a first reflection surface to reflect the first beam, and
a first angle between an orthogonal surface orthogonal to the first beam and the first reflection surface is greater than 0° and smaller than 45°.

17. An image display apparatus comprising:
a case;
a display;
a camera disposed in the case; and
a controller configured to control the display to display an image captured by the camera,
wherein the camera comprises:
a first optical structure configured to refract and reflect a first beam to output a second beam with a width smaller than a width of the first beam; and
a second optical structure configured to refract and reflect the second beam from the first optical structure to output a third beam with a width greater than the width of the second beam,
wherein a height of the first optical structure and a height of the second optical structure are the same,
wherein a width of the first beam and a width of the second beam are the same,
wherein the first optical structure comprises a first reflection surface configured to reflect the first beam, and
wherein a first angle between an orthogonal surface orthogonal to the first beam and the first reflection surface is greater than 0° and smaller than 45°.

18. The image display apparatus of claim 17, wherein a ratio of the width of the second beam to the width of the first beam is greater than 0.5 and smaller than 1.

19. The image display apparatus of claim 17, wherein the first optical structure comprises a first convex lens, a first mirror, and a first concave lens, and the first mirror comprises the first reflection surface.

20. The image display apparatus of claim 17, wherein the camera further comprises:
   a lens structure disposed between the first optical structure and the second optical structure, wherein the lens structure comprises a plurality of lenses and at least one the plurality of lenses is movable to achieve variable focus; and
   an image sensor configured to convert light from the second optical structure into an electric signal corresponding to an image.

* * * * *